United States Patent
Crane et al.

(10) Patent No.: US 10,053,391 B2
(45) Date of Patent: Aug. 21, 2018

(54) GLAZE-LIKE COATINGS USED TO MAKE OVEN BAKE CLAYS FOOD AND DRINK SAFE

(71) Applicants: Noah Lee Crane, Waban, MA (US); Alan Laurence Crane, Waban, MA (US)

(72) Inventors: Noah Lee Crane, Waban, MA (US); Alan Laurence Crane, Waban, MA (US)

( * ) Notice: Subject to any disclaimer, the term of this patent is extended or adjusted under 35 U.S.C. 154(b) by 63 days.

(21) Appl. No.: 15/241,369

(22) Filed: Aug. 19, 2016

(65) Prior Publication Data

US 2017/0050889 A1  Feb. 23, 2017

Related U.S. Application Data (60) Provisional application No. 62/208,630, filed on Aug. 22, 2015.

(51) Int. Cl.
| | |
|---|---|
| *C04B 41/48* | (2006.01) |
| *C04B 41/00* | (2006.01) |
| *C09D 123/06* | (2006.01) |
| *A21B 3/00* | (2006.01) |
| *C04B 41/83* | (2006.01) |
| *C04B 111/00* | (2006.01) |

(52) U.S. Cl.
CPC ............ *C04B 41/4861* (2013.01); *A21B 3/00* (2013.01); *C04B 41/009* (2013.01); *C04B 41/83* (2013.01); *C09D 123/06* (2013.01); *C04B 2111/00965* (2013.01); *C04B 2235/349* (2013.01)

(58) Field of Classification Search
CPC ..... C04B 33/00; C04B 41/45; C04B 41/4535; C04B 41/4578; C04B 41/463; C04B 41/47; C04B 41/472; C04B 41/4826; C04B 41/4876; C04B 41/502; A21B 3/00; C09D 123/06
USPC ........................................ 427/385.5
See application file for complete search history.

(56) References Cited

U.S. PATENT DOCUMENTS

2015/0344718 A1* 12/2015 Lundgard ............ C09D 123/06
428/334

* cited by examiner

*Primary Examiner* — Alexander M Weddle (57) ABSTRACT

The present invention is directed at coatings for oven bake clay that when applied make the surface of the resulting object food safe. Among the many different possibilities contemplated, the coating may contain one or more food safe plastics that may be in particle form and may form suspensions or colloids when mixed with water, food safe oil or other food safe liquids to ease application. Among the many potential additional ingredients contemplated, the coating may contain one or more surfactants to improve the formation of a suspension or colloid or one or more food safe dyes so that the oven bake clay can be painted. Among the many methods of making the coating contemplated, the components may be mixed to form a suspension or colloid through one or more of agitation, stirring or sonication. It is further contemplated that the coating may be applied to an unbaked oven bake clay object and then baked or alternatively applied to a baked oven bake clay object and then re-baked.

13 Claims, 8 Drawing Sheets

HDPE coatings, 100 micron particle size

HDPE/water mixture

Figure 4

HDPE/oil mixtures

HDPE + cottonseed oil     HDPE + canola oil     HDPE + olive oil

Figure 5

HDPE/water mixture plus surfactant

HDPE + water
+ surfactant

Figure 6

HDPE/oil mixtures with various amounts of HDPE per 10 mls oil

GLAZE-LIKE COATINGS USED TO MAKE OVEN BAKE CLAYS FOOD AND DRINK SAFE

CROSS REFERENCE TO RELATED APPLICATION

This application claims priority to and the benefit of U.S. Provisional Application No. 62/208,630, filed Aug. 22, 2015, entitled "Glaze-Like Coatings Used to Make Oven Bake Clays Food and Drink Safe," the disclosure of which is expressly incorporated hereby by reference.

FIELD OF THE INVENTION

The invention is generally in the field of coatings used over oven bake clay where such coatings can be heated to between 100 and 1000 degrees Fahrenheit to allow the resulting coated materials to be used safely in applications with foods and drinks.

BACKGROUND OF THE INVENTION

There is a need for coatings for oven bake clay that are food and drink safe.

Ceramics are used to make a variety of objects. These include industrial and home applications. Among the home applications are artistic creations and other household items as well as items used for eating and drinking, such as plates, cups, bowls, and serving pieces. Ceramics have the advantage that they can be coated with glaze and fired at high temperatures. Many readily available glazes are certified for use with foods and drinks. Glazes work by forming a non-porous glass-like coating that seals any toxic materials in the clay and reduces porosity. The non-porous, smooth surface avoids creating an environment where potentially harmful microorganisms can grow and reduces the potential for liquids to erode the underlying clay.

The issue with ceramics and with glaze is that they require firing in a kiln. Kilns are expensive, require specialized training and are not readily available in most homes.

As a result, modeling clays have been developed so that those without access to a kiln can make similar objects. Modeling clays include several sub-types: oven bake clays, oil-based clays and paper or air-dry clays. Oven bake clays are made of polymers such as polyvinyl chloride (referred to as polymer clays) or crystalline silica. Brands of oven bake clays include Sculpey, Fimo, Cernit, Premo, Modello, Du-Kit, Kato Polyclay, Formello, Friendly Clay, Artist's Modelene, Jack Johnston's Clay, Prosculpt and Laguna Clay. Most of these oven bake clays are made of polyvinyl chloride and are baked at 250 degrees to 300 degrees Fahrenheit. Laguna Clay is made of crystalline silica and is baked at 350 degrees Fahrenheit. In addition, various home made formulations have been developed that generally include flour and water. While not as durable as commercially available oven bake clays, these formulations can be hardened in the oven at similar temperatures or air-dried. Generally, oven bake clays can be hardened to a greater extent than other modeling clays and are more durable once baked. Paper or air-dry clays harden when exposed to air and oil-based clays remain more malleable even after exposure to air.

These various types of modeling clays are useful for making artistic creations but cannot be employed in making food and drink safe items. This is because there are no coatings for these products that seal in the toxic materials and form a smooth, non-porous surface. A smooth, non-porous surface is necessary to prevent the growth of microorganisms and to prevent erosion by liquids as well as to seal in toxic materials. Conventional glazes cannot be used on modeling clays because the glassification process requires temperatures well over 1000 degrees Fahrenheit. At these temperatures, these various types of modeling clay products would burn and in some cases would release toxic fumes and toxic breakdown products.

Therefore, there is a need for a composition that can be used over modeling clays to form a smooth, non-porous coat and hence food and drink safe coating at lower temperatures. In particular, there is a need for such a composition that can be used at less than 1000 degrees Fahrenheit and preferably less than 500 degrees Fahrenheit, and most preferably less than about 400 degrees Fahrenheit or 300 degrees Fahrenheit. These are temperatures that can be achieved in a home oven or toaster oven and that do not burn the polymer clay or cause the release of excessive toxic fumes or breakdown products.

A number of the manufacturers of modeling clays make glazes for decorative purposes. These glazes are designed to change the appearance to a gloss or matt finish or change the color of the modeling clay. These glazes do not require baking but also are not food and drink safe. They are generally made of polyurethanes. These materials do not provide the seal, durability and smooth surface required for designation as food and drink safe.

Jeanne A. E. DeVoto (http://www.jaedworks.com/clay-spot/polyclay-faq/finishing.html) has suggested the use of products such as Flecto Varathane Elite Diamond Finish (polyurethane based) and Future floor polish (styrene/acrylic copolymer based) both of which are not designed to provide a food and drink safe coating but instead may be used as a less expensive alternative to decorative glazes sold by manufactures of oven bake clay.

Eileen Bergen (http://www.theartfulcrafter.com/blog/polymer-clay-two.html) has suggested a food and drink safe coating for polymer clay using carnauba wax or shellac NF. While she suggests that these materials are themselves food safe, she does not describe attempting to glaze polymer clay using these materials and has not demonstrated that they can provide a sealed, smooth, non-porous surface over these materials.

Several patents describe coatings for modeling clays or, alternatively, food safe coatings. However, none of these patents describe a food safe coating for oven bake clay. Spector Herman describes a method of coating oil-based clays in "Process for coating modeling clay and product produced thereby" US Patent Publication number U.S. Pat. No. 3,558,340 A. However, his inventions do not pertain to oven bake clay, and his invention is focused on hardening oil-based clay rather than providing a food safe surface. Isoya Mamoruwpo describes in World Intellectual Property Organization publication number 10099196 a method for coating ceramic using silver ion as an antibacterial. However, his coating is for use over conventional ceramics, not oven bake clay, and requires heating to 1472 degrees Fahrenheit (800 degrees Celsius), a temperature that is too high for use with oven bake clay.

There is a need for a coating that can be used over oven bake clay that provides a reliable smooth, non-porous food and drink safe coating that is durable and long lasting.

SUMMARY OF THE INVENTION

The present invention is directed at coatings for oven bake clay that when applied make the surface of the resulting object food safe.

Among the many possibilities contemplated, the coating can contain one or more food safe plastics. It is further contemplated that the plastics may be chosen from one or more of HDPE, LDPE, polypropylene, PET, polystyrene or polycarbonate, most preferably HDPE, LDPE or polypropylene. In addition, it is contemplated that the plastic may be in the form of particles of less than 100 microns in mean size ("mean size" is defined here and throughout the patent as measured by laser diffraction or alternatively direct examination under a microscope), preferably less than 50 microns in mean size. In order to allow for easy application of the coating to an object, it is also contemplated that the plastic in the coating forms a suspension or colloid, most preferably a uniform and stable suspension or a colloid. It is further contemplated that the plastic particles are mixed with one or more food safe liquids, such as glycerine, acetic acid, ethanol, cooking oil or water. It is also contemplated that the plastic particles may be added in a ratio of less than 10 grams of plastic per 10 mls of food safe liquid, preferable, less than 6 grams of plastic particles per 10 mls of food safe liquid, most preferably less than 4 grams of plastic particles per 10 mls of food safe liquid. Among the many potential additional ingredients contemplated, the coating may contain a surfactant to improve the formation of a suspension or a colloid. It is also contemplated that the surfactant may be added to the mixture such that less than 10 grams of surfactant is added per 10 mls of food safe liquid, preferably less than 5 grams of surfactant is added per 10 mls of food safe liquid, most preferably less than 3 grams of surfactant is added per 10 mls of food safe liquid. It is further contemplated that the coating may contain a food safe dye, which may be water-soluble or oil soluble, so that the oven bake clay can be painted. It is also contemplated that the dye may be added such that less than 2 grams of dye is added per 10 mls of food safe liquid, preferably less than 1 gram of dye per 10 mls of food safe liquid.

Among the many methods of making the coating contemplated, the components may be mixed to form a suspension or a colloid through one or more of agitation, stirring or sonication, most preferably creating a uniform and stable suspension or a colloid. It is further contemplated that the components may be mixed together at less than 200 degrees Fahrenheit, preferably less than 50 degrees Fahrenheit, most preferably less than 40 degrees Fahrenheit.

Among the many methods of using the coating, it is contemplated that the coating may be applied to an unbaked oven bake clay object and then baked or alternatively applied to an already baked oven bake clay object and then re-baked. It is further contemplated that the coating is baked at less than 1000 degrees Fahrenheit, preferably between 100 degrees Fahrenheit and 500 degrees Fahrenheit, most preferably between 200 degrees Fahrenheit and 400 degrees Fahrenheit. Among the many possibilities, it is contemplated that the coating is applied by one or more of using a paint bush, using a cloth, using a spraying device, or by submersion, or alternatively by pouring the coating on the object. It is further contemplated that the coating may be used to paint the object as well as to make it food safe, that the coating is used to coat one or more surfaces that are horizontal, vertical, sloped, on the top of the object, on the bottom of the object or on the sides of the object. It is also contemplated that that the coating is mixed by one or more of agitation or stirring prior to application on the oven bake clay, preferably wherein the coating is agitated or stirred for less than 1 minute, more preferably less than 30 seconds.

BRIEF DESCRIPTION OF THE DRAWINGS

FIG. 1A shows the results of coating from a mixture 1 gram of HDPE in 10 mls water on the upper left and 1 gram of HDPE in 10 mls of cottonseed oil on the lower right. FIG. 1B shows a darker Sculpey (dark green) coated with 1 gram of HDPE in 10 mls of cottonseed oil.

DETAILED DESCRIPTION OF THE INVENTION

I. Definitions

The terms "food safe" or "food and drink safe" as used herein can refer to either a liquid or on the other hand to a solid such as a plastic and the surface formed by such substances. When referring to a liquid, "food safe" or "food and drink safe" means that the liquid is regarded as safe for human consumption. Food safe liquids include but are not limited to water, ethanol, acetic acid, cooking oils and glycerin. When referring to a solid such as a plastic, "food safe" or "food and drink safe" means that a surface can be formed by such a substance that comes into contact with food or drink and does not result in exposure to levels of toxic materials or microorganisms that can make an individual ill either with acute or chronic exposure. Many plastics are used in food safe applications because they can be formed into smooth surfaces that are not prone to enabling the growth of microorganisms. A number of types of plastic are used in food and drink safe applications. Food and drink safe plastics include high-density polyethylene (HDPE), low density polyethylene and polyethylene (LDPE), and polypropylene. In addition, polyethylene terephthalate (PET or PETE) is generally regarded as safe for single use applications. PET can leach antimony, a known toxin, when exposed to heat or detergents when being cleaned, so it is regarded as less safe for repeated use after cleaning. Polyvinyl chloride is also used in food applications but is regarded as less food safe. The National Institutes of Health regards di-2-ethylhexyl phthalate (DEHP), which can leach from polyvinyl chloride, as a potential carcinogen. Polystyrene is also used in food applications but is regarded as less safe as it can leach butadiene and styrene, which are both known carcinogens. Polycarbonate is used in food applications and is regarded as less safe because it can leach biphenyl-A, which is a potential carcinogen.

The term "modeling clay" as used herein refers to any of several types of materials that can be formed like clay but that do not require baking in a kiln at temperatures well in excess of 1000 degrees Fahrenheit. Several sub-types of modeling clay include oven bake clay, oil-based clay and paper or air-dry clay. Oil-based clays are made from various combinations of oils, waxes and clay minerals. Oil-based clay remains malleable, is not fired, and cannot be used in food and drink applications because it does not harden. Paper or air-dry clay contains processed cellulose which increases the tensile strength of the dry clay and enables it to become firm with air-dried. Paper or air-dry clay is not strong enough to be used in food-based applications.

The term "oven bake clay" as used herein refers to clays that are made of polymers such as polyvinyl chloride (referred to as polymer clays) or crystalline silica. Brands of oven bake clays include Sculpey, Fimo, Cernit, Premo, Modello, Du-Kit, Kato Polyclay, Formello, Friendly Clay, Artist's Modelene, Jack Johnston's Clay, Prosculpt and Laguna Clay. Most of these oven bake clays are made of polyvinyl chloride and are baked at 250 degrees Fahrenheit to 300 degrees Fahrenheit. Laguna Clay is made of crystalline silica and is baked at 350 degrees Fahrenheit. In addition, various home made formulations have been developed that generally include flour and water. While not as durable as commercially available oven bake clay, these formulations can be hardened in the oven at similar temperatures or air-dried. Generally, oven bake clays can be hardened to a greater extent than other modeling clays and are more durable once baked.

The term "cooking oil" as used herein refers to an oil that is edible and used in cooking including but not limited to olive oil, palm oil, soybean oil, canola oil, pumpkin seed oil, corn oil, sunflower oil, safflower oil, peanut oil, grape seed oil, cottonseed oil, sesame oil, argan oil, rice bran oil, and other vegetable oils, seed oils and nut or nut shell oils as well as animal based oils like butter and lard.

The term "surfactant" as used herein means a compound that lowers the surface tension between a liquid and a solid, thereby enabling the mixture to form a stable suspension or colloid. Some surfactants can be used to form a food safe coating. Examples of surfactants include monoglycerides, lecithins, glycolipids, fatty alcohols, fatty acids, polysaccharides and small molecules. Specific examples of surfactants include polysorbate 80 and polysorbate 20.

The term "dye" as used herein means a substance that imparts color when added to the coating. Food safe dyes are those that can be added to the coating formulation and don't make the resulting coating not food safe. "Water soluble dyes" are those that dissolve in water and "oil soluble dyes" are those that dissolve in oil. For example, Shaw's offers Assorted Food Coloring & Egg Dye, which is water-soluble and comes in green, yellow, red and blue. Also by example, Le Melange (http://lemelange.com/fdcpowdereddye.aspx) offers oil soluble food safe dyes including: F, D & C orange, F, D & C green, F, D & C blue, F, D & C black, F, D & C red, F, D & C violet, and F, D & C yellow.

The term "suspension" as used herein refers to a heterogeneous mixture containing solid particles that are dispersed throughout a liquid. Generally, the particles in a suspension are larger than about 1 micron in size and with time the solid particles will settle. As used herein, the term "stable suspension" means a suspension that can be agitated and will not settle within the time that it is used for coating oven bake clay or typically 15 minutes. "Uniform suspension" as used herein is one that it is well mixed and homogenous, without visible unsuspended plastic.

As used herein, the term "colloid" means a heterogeneous mixture containing solid particles that are dispersed throughout a liquid where the particles do not settle out of the liquid. Generally, the particles in a colloid are less than 1 micron in size.

II. Food Safe Oven Bake Clay Coatings

Food safe coatings for oven bake clay described herein are composed of one or more food safe plastics combined with one or more food safe liquids and optionally one or more food safe surfactants or food safe dyes. The resulting formulation is a uniform suspension or colloid and is applied to the oven bake clay to provide a food safe coating. The coating adheres to horizontal, vertical and sloped surfaces of the oven bake clay object.

A. Food and Drink Safe Plastics

HDPE, LDPE, and polypropylene are food safe with heating (without degradation or leaching) and can be softened to create a smooth coating at temperatures that are not so high that the coated oven bake clay begins to melt. As a result, HDPE, LDPE, and polypropylene are preferred plastics to be used in food safe coatings for oven bake clay. HDPE has a melting point of 248 degrees Fahrenheit to 355 degrees Fahrenheit and begins to soften at lower temperatures. LDPE has a melting point of between 221 degrees Fahrenheit and 239 degrees Fahrenheit. Polypropylene has a melting temperature of 266 degrees Fahrenheit. Polyvinyl chloride, which is the most common ingredient in oven bake clay and is regarded as less food safe, begins to decompose at temperatures of 284 degrees Fahrenheit and has a melting point of 320 degrees Fahrenheit. It is not regarded as safe to use without coating because of the degradation that occurs with heating. PETE, which is generally regarded as less food safe, melts at 500 degrees Fahrenheit, which is too high for use with polyvinyl chloride oven bake clay. Polystyrene is also regarded as less food safe and also has too high a melting point (464 degrees Fahrenheit) for use with polyvinyl chloride oven bake clay. Both PETE and polystyrene, also cannot be used as coatings over crystalline silica oven bake clay, which is heated to 350 degrees for baking.

Polycarbonate, which is regarded as less food safe, has a glass transition temperature of 297 degrees Fahrenheit. While polycarbonate is less preferred because it is regarded as less food safe, it does have an appropriate glass transition temperature for use with oven bake clay.

In order for any of the plastics described herein to form an adherent coating on the oven bake clay, they must be produced as small particles, which can be formulated in a suspension or colloid. Particles of less than 100 microns generally are preferred as they form stable suspensions of plastics that do not settle out too rapidly.

B. Food Safe Liquids

In order to form an adherent coating that can be painted onto the oven bake clay, the food safe plastic must be formulated in a suspension or colloid. Generally, more viscous liquids, such as oils, can be used to form suspensions or colloids of plastics. The viscous liquid must also be edible so that the resulting surface is food safe. The liquid used can be one or more cooking oils that are edible in order to make the surface food safe. Cooking oils that are animal based are less preferred as they are often not as stable at room temperature and some users have dietary restrictions that would mean that they could not use the resulting products. In addition, oils that are derived from peanuts or other nuts or nut shells are also less desirable because of food allergies.

Less viscous liquids, such as water, can be used but may require the use of a surfactant to form suspensions or colloids. The less viscous liquid used must be edible in order to form a food safe coating.

C. Surfactants

Some liquids require the use of a surfactant in order to form a stable suspension or a colloid. Water, for example, can be formulated with a surfactant and plastic particles to form a stable suspension or colloid.

D. Dyes

The oven bake clay coating can also be used to decorate the object being made with a variety of colors. A food safe dye can be added to the coating allowing the coating to serve as a paint. If the food safe liquid is water soluble, then a water-soluble dye is preferred. If the food safe liquid is an oil, then an oil-soluble dye is preferred.

III. Methods of Making

Food safe coatings for use with oven bake clay can be produced by mixing food safe plastic particles with a food safe liquid, and optionally also adding a surfactant. The plastic particles should be less than 200 microns in mean size, less than 100 microns in mean size, and most preferable, less than 50 microns in mean size. The particles should be mixed in a ratio with less than 6 grams of plastic per 10 mls of food safe liquid, preferably 4 g of plastic or less per 10 mls of food safe liquid. Optionally, less than 10 grams of surfactant can be added per 10 mls of food safe liquid. In a preferred form, less than 5 grams of surfactant is added per 10 mls of the food safe liquid, or more preferably less than 3 grams of surfactant is added per 10 mls of food safe liquid. Also, optionally, less than 2 grams of dye can be added per 10 mls of food safe liquid. In a preferred form less than 1 gram of dye is added per 10 mls of the food safe liquid. The ingredients should be vigorously agitated, stirred or sonicated (or mixed using a combination of these methods) in order to form a uniform suspension or colloid. The resulting formulation can be stored in a container such as a plastic or glass bottle or coated carton. Just before use, if settling has occurred, the formulation can be agitated, for example by hand for about 5 to 10 seconds or up to 30 seconds. Larger containers of more than 100 mls may require more agitation time to achieve a uniform suspension.

IV. Use in Coating Oven Bake Clays

The food safe coatings for oven bake clay described herein can be used as follows. An object is made of oven bake clay. The object can then be coated prior to baking with the coating and then baked at under 1000 degrees Fahrenheit, under 500 degrees Fahrenheit, preferably between 200 degrees Fahrenheit and 400 degrees Fahrenheit, most preferably within 25 degrees Fahrenheit of the oven bake clay manufacturers recommended baking temperature. The object can also be baked prior to applying the coating and then baked a second time with the coating. If the object is baked a second time with the coating it can be baked at under 1000 degrees Fahrenheit occurred, under 500 degrees Fahrenheit, and most preferably between 200 degrees Fahrenheit and 400 degrees Fahrenheit. The coating can be applied using a paintbrush or cloth, a spraying device or the object can be dipped in the coating, or the coating can be poured on the object.

EXAMPLES

Example 1

Particle Size Dependency of Plastic Particles

Particles of two sizes were tested. Particles of approximately 100 microns in size were prepared by grinding an HDPE bottle (Leisure Time Spa 56 Chlorinated Granules 2 pound container). A Ryobi brand circular sander (model number R5290) fitted with Diablo brand Premium Ceramic Blend Sanding Discs (5 inch Universal Hole Pattern, Item number DCD050220H15G) was used to grind the plastic. The resulting powder consisted of particles with approximate average diameter of 100 microns (measured by visual detection using an EyeClops brand television connected microscope relative to a 1 mm marking).

Smaller HDPE particles were obtained from PolyGroup Inc. (http://www.polygroupinc.com/Pages/Microparticles.aspx)—product number FHP 05080. Particles had an average diameter of 38 microns as measured by laser diffraction (see PolyGroup Inc. website).

Figure 1A:
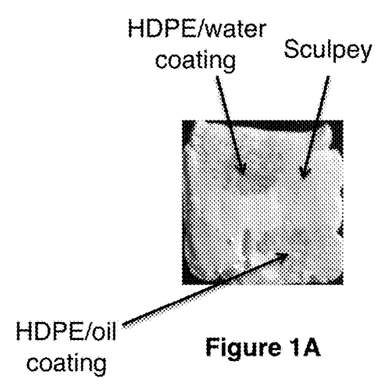
FIGS. 1A and 1B show the coatings made from 100 micron particles of HDPE (high density polyethylene) on a Sculpey surface. In each case, the Sculpey was pre-baked for 15 minutes at 275 degrees Fahrenheit and then the coating was baked with the Sculpey for 15 minutes at 275 degrees Fahrenheit.
Figure 1B:
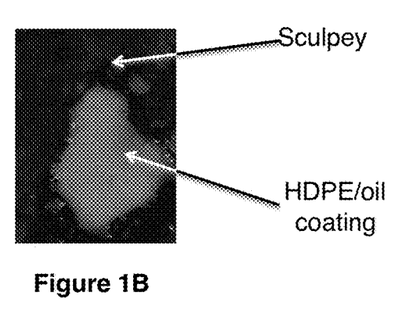

Larger particles obtained by grinding did not form a uniform suspension in cottonseed oil (Glicks brand) or water. When 10 mls of either cottonseed oil or water was mixed with 1 gram of these larger particles and painted onto baked Sculpey brand oven bake clay (pre-cooked for 15 minutes at 275 degrees Fahrenheit) and then baked at 275 degrees Fahrenheit for 15 minutes, the HDPE formed a thick coat and was not adherent during painting or after cooking (plastic coating easily slipped off the Sculpey after cooling and drying). All baking described throughout the examples was accomplished using a Cuisinart model TOB 30BC toaster oven. FIG. 1A shows a photograph of the water/particle mixture coating on top left and oil/particle mixture coating on bottom right. FIG. 1B shows a photograph of the oil/particle mixture coating to dark green colored Sculpey (dark background).

Figure 2:
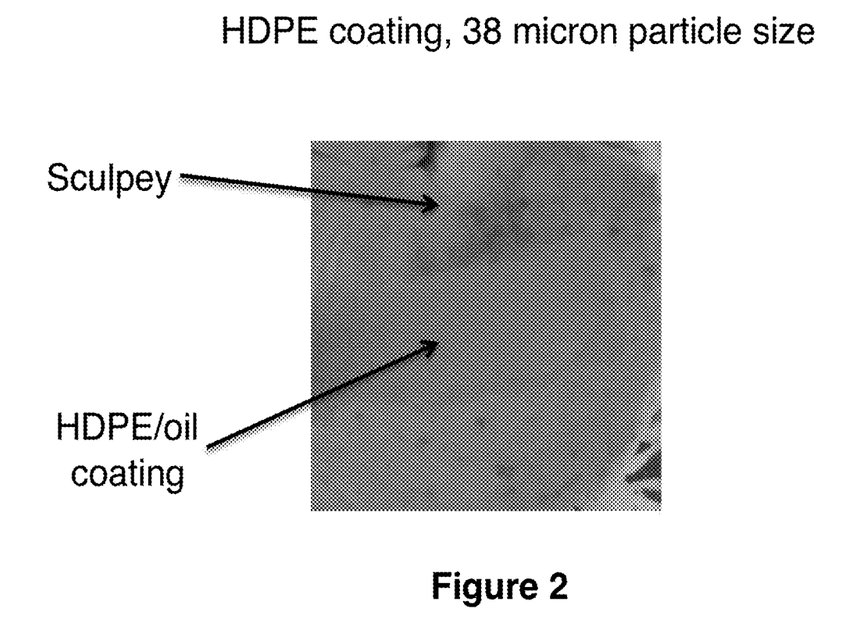
FIG. 2 shows the coating made from 38 micron particles of HDPE (high density polyethylene) on a Sculpey surface. The Sculpey was pre-baked for 15 minutes at 275 degrees Fahrenheit and then the coating was baked with the Sculpey for 15 minutes at 275 degrees Fahrenheit. The HDPE coating mixture consisted of 1 gram of HDPE in 10 mls of cottonseed oil.

Smaller particles obtained from PolyGroup Inc. formed a uniform suspension in the cottonseed oil (1 gram of HDPE added to 10 ml of cottonseed oil) but did not go into the suspension at all in water (1 gram of HDPE added to 10 ml of water). All weight measurements throughout all of the examples were taken using a Salter brand digital scale, model number 1250BKSLT. All volume measurements in the examples were made using a Walgreen 10 ml medicine spoon. The cottonseed oil/HDPE suspension was applied to pre-baked Sculpey (cooked for 15 minutes at 275 degrees Fahrenheit) and then cooked for 15 minutes at 275 degrees Fahrenheit. The suspension was adherent to the Sculpey in both the horizontal and vertical positions and formed a thin uniform coating. FIG. 2 shows a photograph of this coating in the center from left to right.

Figure 3:
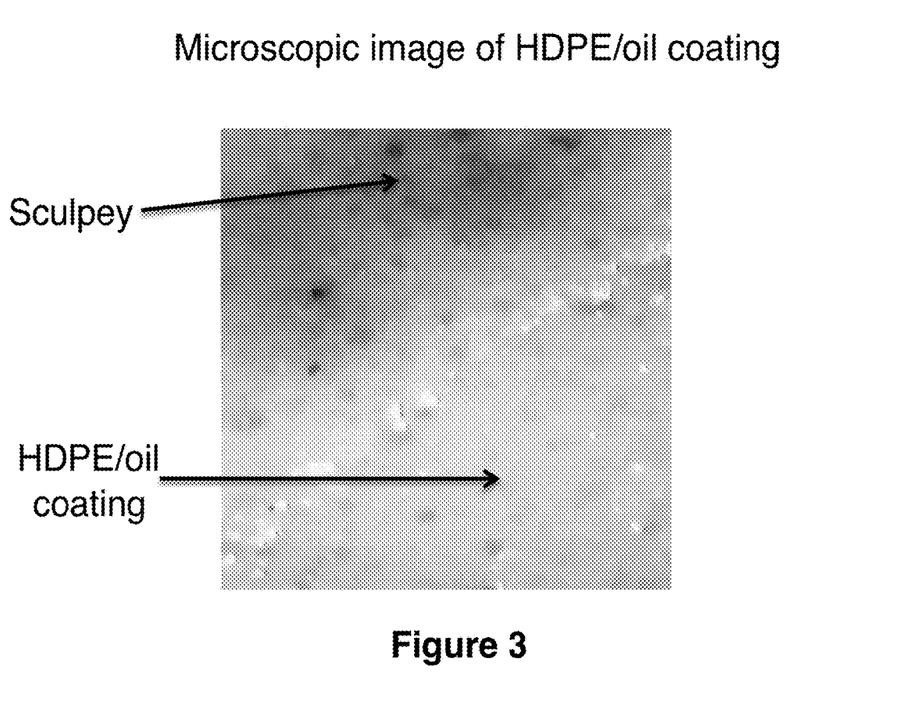
FIG. 3 shows a microscopic image of a coating made from a mixture of 1 gram of 38 micron particles of HDPE (high density polyethylene) in 10 mls of cottonseed oil. The Sculpey was pre-baked for 15 minutes at 275 degrees Fahrenheit and then the coating was baked with the Sculpey for 15 minutes at 275 degrees Fahrenheit. The image shows both the coated surface and the adjacent uncoated Sculpey.

The coating provides a smooth, food safe glistening coat over the underlying Sculpey (which in its uncoated form is not food safe) as seen in the EyeClops television microscope picture in FIG. 3 (top left is untreated Sculpey, bottom right with coating).

Example 2

Food Safe Liquid Dependency (Water and Different Oils)

Figure 4:
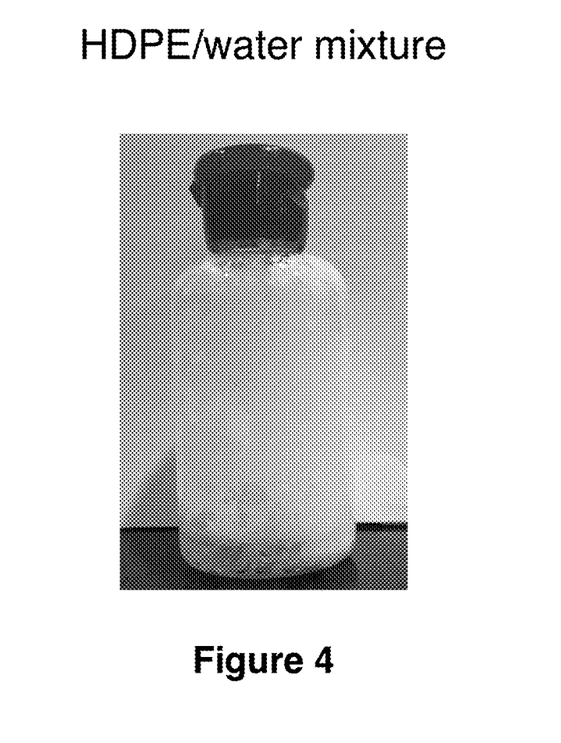
FIG. 4 shows a mixture of 1.01 grams of 38 micron particles of HDPE (high density polyethylene) in 10 mls of water.

PolyGroup Inc. 38 micron HDPE particles (as described above) were formulated in various food safe oils or water. 1.01 g of particles was added to 10 ml of tap water and agitated vigorously by hand. However, the particles would not form a suspension with the water as shown in FIG. 4.

Figure 5:
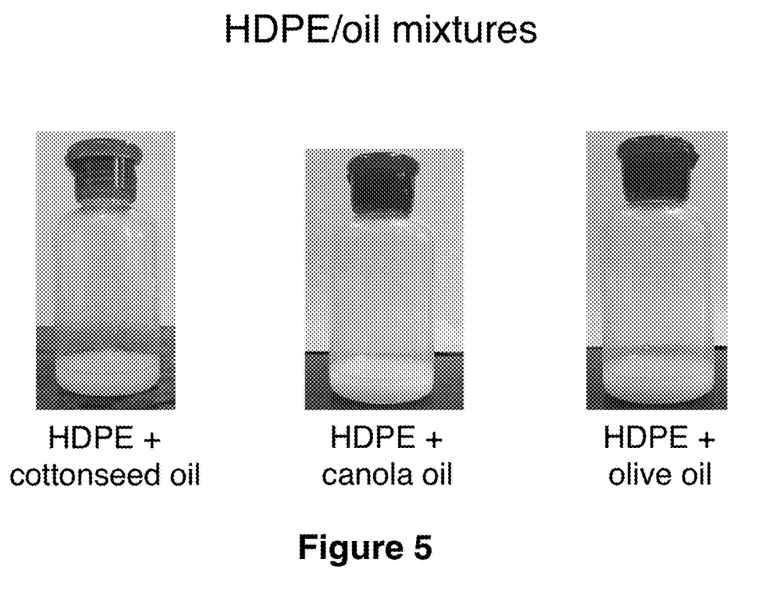
FIG. 5 shows mixtures of 38 micron particles of HDPE (high density polyethylene). The picture on the left shows a mixture of 1.03 g HDPE in 10 mls cottonseed oil. The picture in the center shows a mixture of 1.02 g HDPE in 10 mls canola oil. The picture on the right shows a mixture of 1 g HDPE in 10 mls olive oil.

The same PolyGroup particles were formulated in cottonseed oil as described above (1.03 g of particles added to 10 ml oil), Wesson brand canola oil (1.02 g of particles added to 10 ml of oil), and Essential Everyday Extra Virgin Olive Oil First Cold Press (1.00 g of particles added to 10 ml of oil). All three food safe oils formed a homogenous suspension with hand agitation, however the olive oil suspension had a dark yellow color that was less aesthetically pleasing. FIG. 5 shows photographs of cottonseed oil at left, canola oil center and olive oil at right.

Example 3

Use of Surfactant in Coatings

Figure 6:
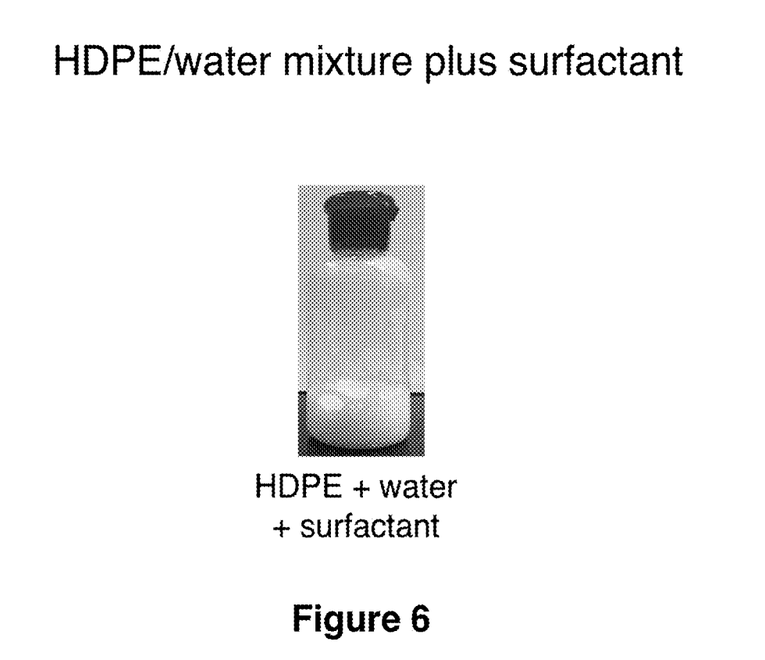
FIG. 6 shows a mixture of 1.01 grams of 38 micron particles of HDPE (high density polyethylene) plus 1.06 grams of polysorbate 80 in 10 mls of water.

In order to attempt to create homogenous suspensions of PolyGroup HDPE particles (as described above) in water, a surfactant was tested. Polysorbate 80 (from Bramble Berry of Bellington, Wash.) was used as a surfactant. 1 ml of polysorbate 80 (equivalent to 1.06 grams of polysorbate 80) was added to 10 ml of water and 1.01 g of PolyGroup HDPE particles. With vigorous hand mixing, the addition of the surfactant enabled a homogenous suspension as shown in the picture in FIG. 6.

The resulting suspension had foam above the liquid phase after shaking, which is less desirable aesthetically and makes the coating less easy to use. In addition, heating of polysorbate 80 to temperatures that are in the range required for coating an oven bake clay has the potential to cause toxic breakdown products including formaldehyde and acetaldehyde that are not food safe.

Example 4

Ratio of Plastic to Food Safe Liquid

Figure 7:
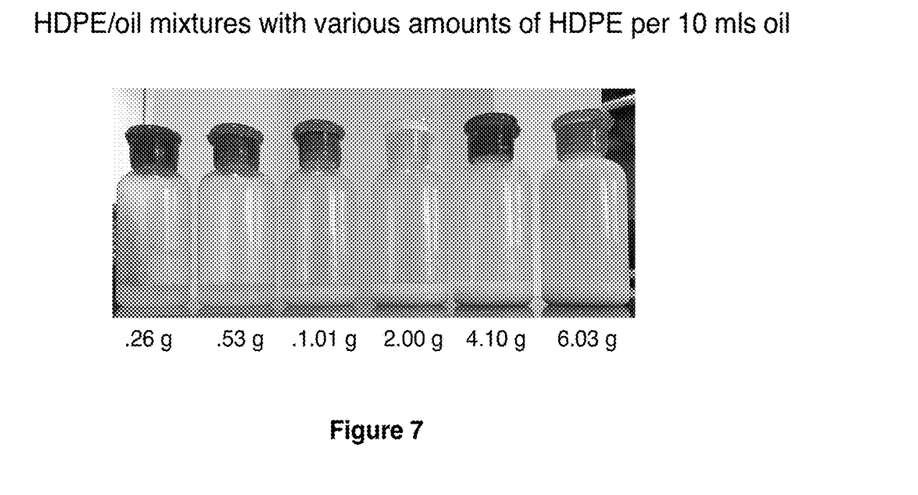
FIG. 7 shows mixtures of 38 micron particles of HDPE (high density polyethylene) at multiple concentrations in cottonseed oil. From left to right, the pictured mixtures contain 10 mls cottonseed oil with 0.26 g HDPE, 0.53 g HDPE, 1.01 g HDPE, 2.00 g HDPE, 4.10 g HDPE, and 6.03 g HDPE.
Figure 8:
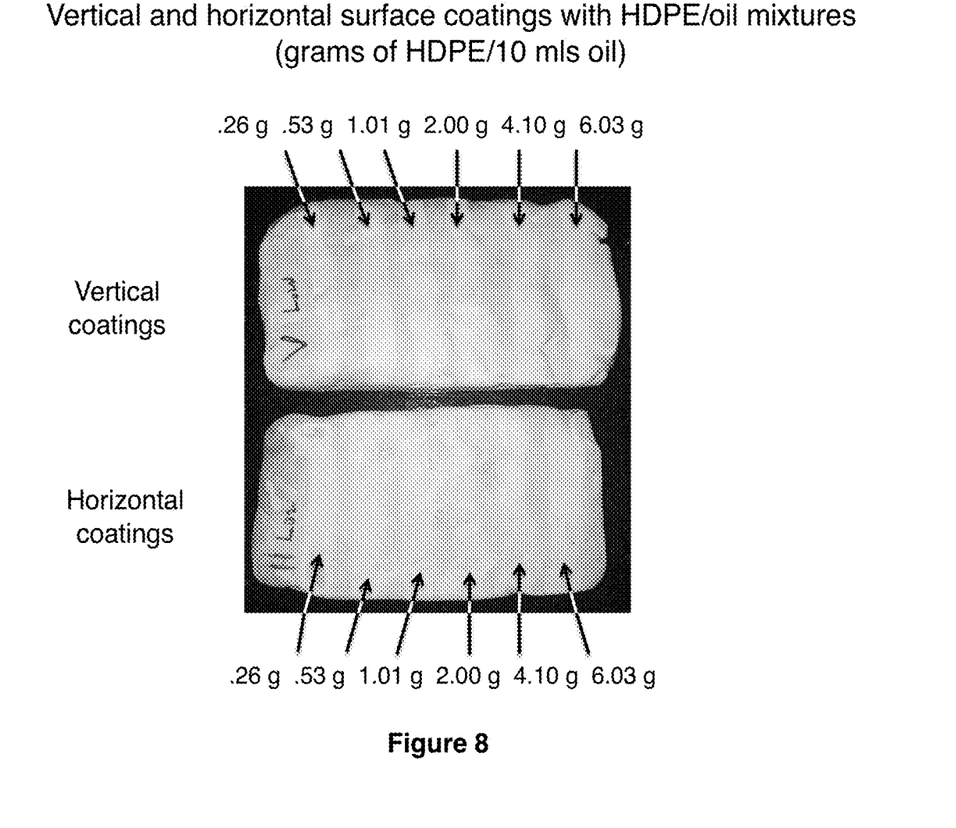
FIG. 8 shows coatings of 38 micron particles of HDPE (high density polyethylene) in the vertical and horizontal position. The Sculpey was pre-baked for 15 minutes at 275 degrees Fahrenheit and then the coatings were baked with the Sculpey for 15 minutes at 275 degrees Fahrenheit. One piece of Sculpey was baked in the verical position with the coatings and another piece was baked in the horizontal position with the coatings. For both pieces of Sculpey, the coatings include (from left to right) mixtures of 10 mls cottonseed oil with each of 0.26 g HDPE, 0.53 g HDPE, 1.01 g HDPE, 2.00 g HDPE, 4.10 g HDPE, and 6.03 g HDPE.

In order to determine the acceptable range of ratios of plastic particles to food safe liquid, a number of concentrations were tested. Formulations were made using PolyGroup HDPE particles as described above and cottonseed oil as described above. Formulations included the following amounts of particles added in each case to 10 mls oil: 0.26 g, 0.53 g, 1.01 g, 2.00 g, 4.10 g and 6.03 g. The photograph in FIG. 7 shows the six formulations from left to right in order of increasing concentration of particles.

The highest two concentrations had residual particles on the inside of the bottles that would not go into suspension. All six formulations were stable at 132 days at room temperature and easily went back into suspension with less than five seconds of hand agitation (however, the highest two concentrations still would not completely go into suspension). Oil and plastic are both known to be highly stable at room temperature for many years. The coating ability of these different formulations was tested on both horizontal and vertical surfaces as described in example 5 below.

Example 5

Coating Multiple Surfaces of Objects

The six formulations prepared according to the description in Example 4 above were tested for their ability to coat both horizontal and vertical surfaces. In each case, the formulations were coated on pre-baked Sculpey (baked for 15 minutes at 275 degrees Fahrenheit). The formulations were painted onto the cooked Sculpey that was then placed in either the horizontal or the vertical position during baking of the coating. The coating was baked in each case at 275 degree Fahrenheit for 15 minutes. The photograph in FIG. 8 shows the vertical surface on the top and the horizontal surface on the bottom. In each case, the lowest concentration of particles is on the left and the concentrations get progressively higher as you move to the right.

The lowest concentration appears to have not coated the underlying Sculpey quite as well, whereas all of the other concentrations showed more complete coating.

In all cases the coating remained in place after one year.

Example 6

Coloring of Coating

The use of a food safe coating can at the same time allow for painting of the underlying oven bake clay. Water-soluble food safe dyes did not achieve coloring. Either 0.05 ml (equivalent to 0.05 grams) or 0.25 ml (equivalent to 0.25 grams) of green dye from Shaws Assorted Food Coloring and Egg Dye was added to 10 ml cottonseed oil (as described above) and 1.03 g PolyGroup particles (as described above). In both cases, the resulting formulation was colored green after shaking by hand. However, painting the formulation on Sculpey and then baking for 15 minutes at 275 degrees F. did not color the Sculpey green. There are oil-soluble food safe dyes that should be used instead when the food safe liquid is an oil as in this case.

Example 7

Time and Temperature of Baking

A variety of times and temperatures were tested to determine which would provide the best results when coating oven bake clay. A formulation consisting of 1.03 g of PolyGroup particles (as described above) was added to 10 ml of cottonseed oil (as described above) and used for testing after hand shaking. The resulting homogeneous suspension was painted onto Sculpey that had been pre-baked for 15 minutes at 275 degrees Fahrenheit. The coating was then baked at 250 degrees Fahrenheit, 275 degrees Fahrenheit and 300 degrees Fahrenheit for 5, 10 or 15 minutes. In addition, the suspension was also painted onto unbaked Sculpey and then the Sculpey and coating were cooked together at 275 degrees Fahrenheit for 15 minutes. The results are shown in Table 1.

TABLE 1

Coating of Sculpey with HDPE/cottonseed oil suspension under varying baking conditions (− indicates coating not formed, + indicates coating formed).

|  | 5 minutes | 10 minutes | 15 minutes |
| --- | --- | --- | --- |
| 250° F. | − | − | + |
| 275° F. | − | − | + |
| 300° F. | − | + | + |
| 275° F., without prebaking | − | − | + |

The melting point of the HDPE particles reported by PolyGroup is 270 degrees Fahrenheit and the softening point is 257 degrees Fahrenheit, so these results are consistent with the reported properties. Excessive baking time does cause browning of lighter colored Sculpey, so cooking the Sculpey and cooking the coating at the same time is preferred.

We claim:

1. A food safe object comprising: (i) an item used for eating and drinking consisting of oven bake clay; and (ii) a food safe coating comprising (A) one or more food safe liquids selected from ethanol, acetic acid, glycerin, cooking oil, and water; and (B) one or more food safe plastics selected from high density polyethylene (HDPE), low density polyethylene (LDPE), polypropylene, polyethylene terephthalate (PETE), polystyrene, and polycarbonate.

2. The food safe coating of claim 1, further comprising one or more food safe surfactants.

3. The food safe coating of claim 1, further comprising one or more food safe dyes.

4. A method of making a food safe object comprising the following steps: (i) forming an item used for eating and drinking from oven bake clay; (ii) coating the item with a food safe coating comprising (A) one or more food safe liquids selected from ethanol, acetic acid, glycerin, cooking oil, and water; and (B) one or more food safe plastics selected from HDPE, LDPE, polypropylene, PETE, polystyrene, and polycarbonate; and (iii) baking the coated item at between 200 degrees Fahrenheit and 400 degrees Fahrenheit.

5. The method of claim 4, further comprising the step of baking the item used for eating and drinking at between 200 degrees Fahrenheit and 400 degrees Fahrenheit prior to coating the item.

6. The method of claim 4, wherein the one or more food safe plastics comprise particles of less than 100 microns in mean size.

7. The method of claim 4, further comprising the step of forming a suspension comprised of the one or more food safe plastics and the one or more food safe liquids.

8. The method of claim 4, further comprising the step of forming a colloid comprised of the one or more food safe plastics and the one or more food safe liquids.

9. The method of claim 4, wherein the coating further comprises one or more food safe dyes.

10. The method of claim 9, wherein the coating is used to paint the item a color as well as to make it food safe.

11. The method of claim 4, wherein the coating further comprising or more food safe surfactants.

12. The method of claim 4, wherein the coating step comprises one or more of using a paint bush, using a cloth, using a spraying device, submersing the item in the coating, and pouring the coating on the object.

13. A food safe object made by the following process: (i) forming an item used in eating and drinking from oven bake clay; (ii) coating the item with a food safe coating comprising (A) one or more food safe liquids selected from ethanol, acetic acid, cooking oil, and water; and (B) one or more food safe plastics selected from HDPE, LDPE, polypropylene, PETE, polystyrene, and polycarbonate; and (iii) baking the item and the coating at between 200 degrees Fahrenheit and 400 degrees Fahrenheit.

* * * * *